United States Patent
Moore et al.

(10) Patent No.: US 9,394,477 B2
(45) Date of Patent: Jul. 19, 2016

(54) METHOD FOR PRODUCTION OF PROPPANTS

(75) Inventors: Gregory James Moore, Singleton (AU); Timothy Neil Barnett, Yuleba (AU)

(73) Assignee: YULEBA MINERALS PTY LTD, Yuleba, Queensland (AU)

( * ) Notice: Subject to any disclaimer, the term of this patent is extended or adjusted under 35 U.S.C. 154(b) by 0 days.

(21) Appl. No.: 14/111,702

(22) PCT Filed: Feb. 29, 2012

(86) PCT No.: PCT/AU2012/000196
§ 371 (c)(1),
(2), (4) Date: Oct. 14, 2013

(87) PCT Pub. No.: WO2012/139151
PCT Pub. Date: Oct. 18, 2012

(65) Prior Publication Data
US 2014/0037962 A1    Feb. 6, 2014

(30) Foreign Application Priority Data
Apr. 15, 2011 (AU) .............................. 2011901418

(51) Int. Cl.
*C09K 8/80* (2006.01)
*B02C 17/16* (2006.01)
*B02C 17/18* (2006.01)

(52) U.S. Cl.
CPC . *C09K 8/80* (2013.01); *B02C 17/16* (2013.01); *B02C 17/18* (2013.01); *Y10T 428/2982* (2015.01)

(58) Field of Classification Search
CPC .......... C09K 8/80; B02C 17/18; B02C 17/16; Y10T 428/2982
USPC ............................ 428/402; 264/310; 425/447
See application file for complete search history.

(56) References Cited

U.S. PATENT DOCUMENTS 8,022,019 B2 *  9/2011  Rush et al. .................... 507/269
2010/0071902 A1  3/2010  Ziegler

FOREIGN PATENT DOCUMENTS

CA    2739580    *  8/2010

OTHER PUBLICATIONS

International Search Report mailed on May 16, 2012 in PCT Application No. PCT/AU2012/000196, international filing date Feb. 29, 2012. (3 pages).

* cited by examiner

*Primary Examiner* — Leszek Kiliman
(74) *Attorney, Agent, or Firm* — Shutts & Bowen LLP

(57) ABSTRACT

Disclosed is an apparatus and method for producing frac sand, in order to meet size, sphericity and roundness standards, from a feedstock such as natural sand. The feedstock is rotated as slurry in a conditioning cell, so that it self abrades to produce frac sand with the required characteristics.

14 Claims, 2 Drawing Sheets

METHOD FOR PRODUCTION OF PROPPANTS

CROSS REFERENCE TO RELATED APPLICATIONS

This application is a §371 national stage entry of International Application No. PCT/AU2012/000196, filed Feb. 29, 2012, which claims priority to Australian Patent Application No. 2011901418 filed Apr. 15, 2011, both of which are hereby incorporated by reference.

TECHNICAL FIELD

The present invention relates to the production of a proppant, particularly frac sand, for use in hydraulic fracturing and similar mining and extractive processes.

BACKGROUND TO THE INVENTION

Proppants, such as frac sand, are utilised in extractive processes using hydraulic fracturing, for example for oil and gas extraction. Hydraulic fracturing (or fracking) is a process which is used to create or extend fractures in rock formations, using the pressure of the hydraulic fluid. The fluid is typically introduced under substantial pressure via a borehole. The fractures assist in the extraction of gas, oil, water or other materials contained in a rock formation, by increasing the porosity of the rock structure.

The function of the proppant is to flow into the fractures in the rock and maintain the fractures open, so that the fractures provide increased porosity in the rock structure and allow the effective extraction of the desired material. The proppant is introduced as a slurry with the hydraulic fluid.

As such, it is important that the proppant has the appropriate physical properties. Depending upon the situation, different proppants may be used. Frac sand is a commonly used proppant material, being formed from natural sand, or sand modified to have the required characteristics. These properties include a sufficient degree of roundness, sphericity and ability to meet a required crushing parameter. One standard for frac sand is established by the American Petroleum Institute 'Recommended Practices for Testing Sand used in Hydraulic Fracturing Operations', RP-56, the disclosure of which is hereby incorporated by reference.

It is disclosed in U.S. patent application No 20100071902 to Zeigler to produce an artificial frac sand from naturally occurring silica sand. This discloses a process of crushing, screening and repeated pneumatic abrasion to achieve the desired sand characteristics. However, this process requires multiple passes, in part because air is not a very efficient way to transfer energy to the sand.

It is an object of the present invention to provide a process for producing frac sand which is more efficient than existing techniques.

SUMMARY OF THE INVENTION

In a broad form, the present invention uses a wet slurry process to self-abrade the natural sand particles, so as to achieve the necessary physical characteristics.

According to one aspect, the present invention provides a process for producing frac sand having a predetermined size range and sphericity from a feedstock material, including at least the steps of:

(a) Placing said feedstock material in a chamber with a liquid, so as to form a slurry, and causing the slurry to rotate under conditions such that the particles in the slurry are caused to mutually abrade;

(b) Continuing to rotate the slurry until such time as at least a substantial part of the particles in the slurry meet the predetermined size range and sphericity requirements.

According to another aspect, the present invention provides an apparatus for producing frac sand having a predetermined size range and sphericity from a feedstock material, the apparatus including a conditioning cell, and including a mechanism for operatively causing a slurry of feedstock material and liquid to rotate within the cell, an entry port for introducing water and feedstock material, and a discharge port for discharging the contents of the conditioning cell.

The present invention also encompasses a frac sand product produced using the inventive method or apparatus.

The use of a wet environment means that the specific gravity of the sand is much closer to the specific gravity of the working medium. As a consequence, the chance of fracturing the silica particles is reduced. This is important as, if the particles are fractured rather than abraded, they will not meet the required size, roundness and sphericity requirements. Accordingly, implementations of the present invention enable improved yields of material meeting the required standard.

A further advantage of implementations of the present invention is that the energy requirements are significantly reduced.

BRIEF DESCRIPTION OF THE DRAWINGS

Illustrative embodiments of the present invention will now be described with reference to the accompanying figures, in which.

DETAILED DESCRIPTION

Figure 1:
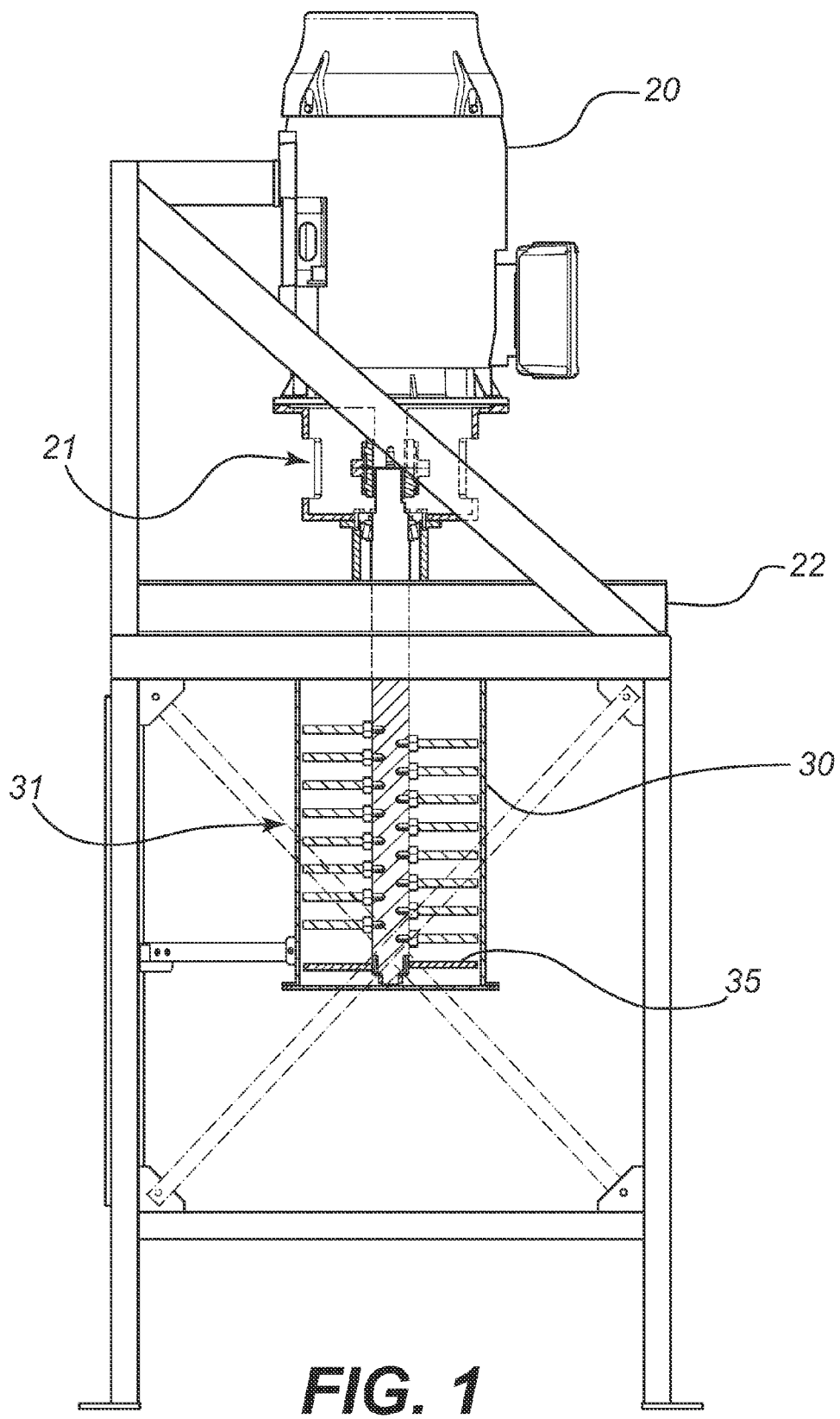
FIG. 1 is a side view, partly in section, of an apparatus according to one implementation of the present invention.

The present invention will be described with reference to a particular illustrative example. However, it will be apparent to those skilled in the art that the principles of the invention may be implemented using many alternative structures, power sources, and feedstocks. It will also be appreciated that the size, shape and scale of the implementation required will lead to necessary changes in the components, shapes, and operating characteristics of the components used for the process, and in the timing and other parameters of the process steps. It is anticipated that a variety of monitoring and control arrangements may be used in conjunction with implementations of the present invention.

The general approach of this implementation of the present invention is to select an appropriate feedstock, screen the material to produce an appropriate starting size range, and process the screened material in a wet conditioning cell, whereby the particles self abrade to improve sphericity and roundness.

The feedstock is preferably high in silica content. Alternatively, the sand feedstock may contain other minerals, with properties comparable to or better than silica for this application. The present invention is not limited in application to any particular sand feedstock, and the approach of the invention may be applied to any kind of suitable mineral feedstock. Whilst not preferred, the present invention could be applied to an artificial proppant material. However, it is preferred that a sand material with a silica content of at least 80% is used. The example below used feedstock with a silica content of 83%.

The sand may be a raw, natural sand, or it may be crushed to achieve the desired particle size. It is important that it is washed so as to remove clay and similar contaminants, or the clay may rub off during the crush test and cause the sand to fail the test.

It is inherent in the process that the material processed in the conditioning cell will be reduced in particle size. Accordingly, it is necessary to use a feedstock for the conditioning cell which is screened to an appropriate particle distribution, given the intended target frac sand size. It has been determined that one suitable starting material is to screen to nominally 50% larger than the target frac sand size. For example, one of the typical hydraulic frac sand sizes is 20/40 (in U.S. mesh sizes) which refers to particles between 850 µm and 425 µm. In this case the target feed stock would be about 1275 µm to 637 µm. Other typical frac sand specifications include 16/30, 30/50, 30/70 and 40/70. Of course, any desired range could be produced according to this invention.

The conditioning cell is partially filled with water, and the feedstock is then loaded into the cell. The precise ratio of water to feedstock can be optimised by the operator with regard to the particular properties of the sand and the dimensions and operating parameters of the conditioning cell. Using a cell as described below, a suitable nominal ratio is 1:1 by volume. Other ratios may be operable or even provide better performance.

While the example uses water alone, the present invention may be implemented with other additives and materials, for example salt water, or bore water. Other additives may be included with the water. Although not presently preferred, the present invention could in principle be implemented using other liquids.

One of the advantages of the present invention is that using a liquid slurry allows for more effective transfer of energy to abrading, rather than fracturing, the feedstock material. It is theorised that at least part of the reason for this is that the density of the liquid is closer to the density of the sand particles. Further modification of the liquid properties by additives, selection of alternative liquids, or otherwise changing the fluid properties may be helpful in optimising the effectiveness of the inventive techniques.

The conditioning cell is essentially a moderately high speed stirrer. It has been determined experimentally that a minimal speed is required to effectively condition the sand. For the experimental arrangement, the minimum rotational speed is at least 850 rpm. It is preferred that the rotational speed is between 720 and 1000 rpm for the cell size in the example below. It will be understood by those skilled in the art that the particles require a certain minimum energy to be transferred in the collisions, or else little or no mutual abrasion will occur. Accordingly, it will be understood that the optimum speed for a given conditioning cell will be dependant upon the feedstock material, the geometry of the cell and the stirrer, the size and shape of the cell, and in general factors which alter the fluid dynamics and rheology of the cell. It will be appreciated that any suitable mechanical system which induces an appropriate motion of the slurry could be used.

FIG. 1 illustrates one practical implementation of the present invention. Support frame 22 supports motor 20 and conditioning cell 30. Support frame 22 may be formed from any suitable material, for example steel sections. Motor 20 is connected by coupling 21 to a stirrer assembly 31 within conditioning cell 30. A fan 36 is provided at the base of the cell.

Figure 2:
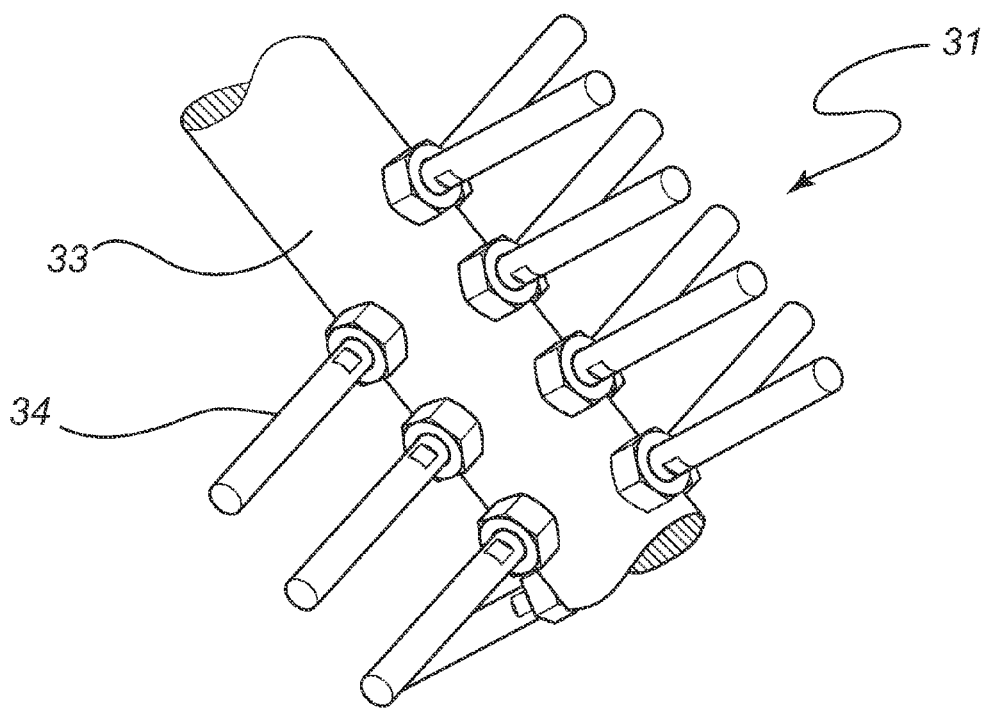
FIG. 2 is a detailed isometric view showing the stirrer structure according to the implementation of FIG. 1.

As can be seen in FIG. 2, the stirrer assembly 31 is formed from a solid shaft 33, from which multiple beater elements 34 extend. The function of the beater elements is to force rotation of the slurry and transfer energy to the slurry from the motor, so that mutual abrasion of the particle occurs, preferably with as little abrasion of the cell and the stirrer assembly as possible. It will be appreciated that, generally speaking, it is preferred that the gap between the wall of cell 30 on the one hand, and the beater elements 34, is minimised. This is to ensure that so far as possible the entire slurry is forced to rotate, while minimising any locations of slower flow.

Figure 3:
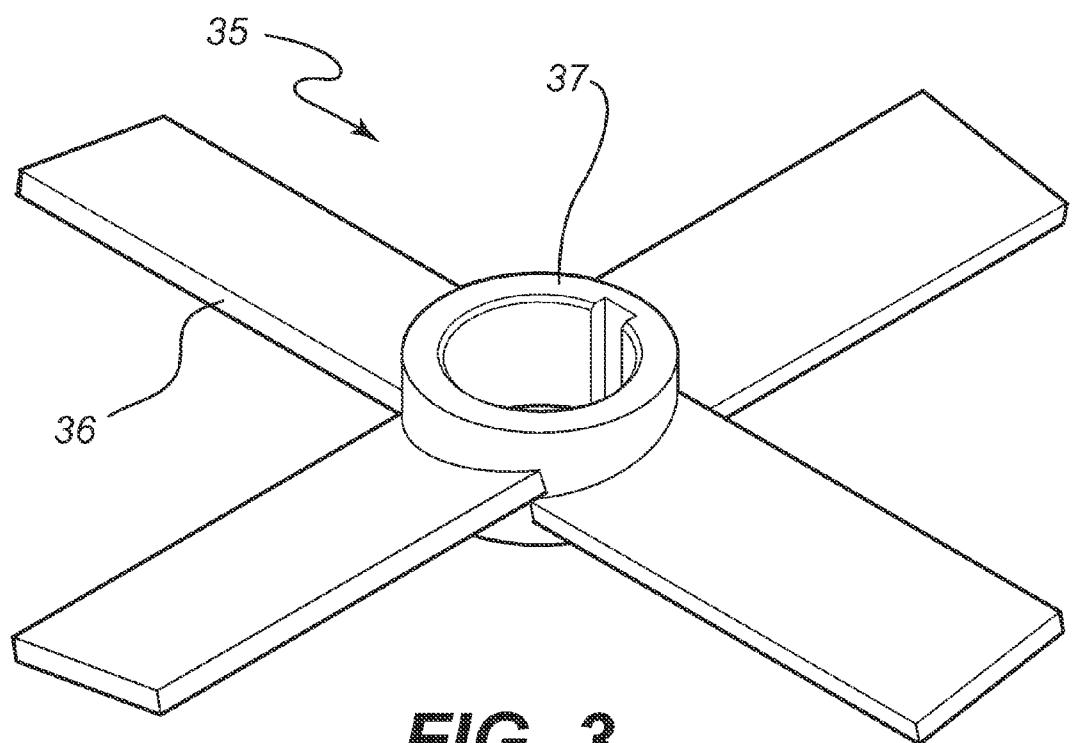
FIG. 3 is a detailed isometric view showing the fan according to the implementation of FIG. 1.

Fan 35 is provided to improve circulation of the slurry, so that there is a constant movement of material away from the base. As can be seen from FIG. 3, the central shaft 37 is hollow, so as to receive shaft 33. The individual fan blades 36 are upwardly angled, so as to produce an upward flow when rotated in the slurry.

In this implementation, sand and water are added through a small opening in the top of conditioning cell 30. Removal of the slurry occurs in this implementation by removal of the bolted on lower plate of the conditioning cell 30. It will be appreciated that in a larger scale implementation, suitable valves, hoppers, conduits etc could be provided to automate these steps.

In this implementation, the cell is 450 mm in diameter, and 1200 mm in length. It is loaded with 150-200 kg of sand, and 150 to 200 L of water.

The sand is conditioned in the cell either for a set time, or until the sand has been suitably conditioned. This may be determined, for example, by inspecting a sample of the sand. Alternative monitoring and control process may be used. For example, another method which may be used in a suitable arrangement is to monitor the motor current, or power draw. As the particles improve in sphericity and roundness, the difficulty of the rotating the slurry decreases, with corresponding reductions in motor current and hence power drawn by the motor.

Over time, experience with particular input materials and conditions in a particular cell may allow a simple elapsed control to provide sufficient accuracy. Using the preferred set up, approximately 750 W of power for 12 minutes is required to condition 1 kg of sand.

After conditioning, the sand and water slurry is discharged out the base of the conditioning cell, and water is used to flush the cell. The cell's contents are discharged into a launder sump. This sump has a constant up current of water and a discharge weir which is designed to lift any of the under 75 µm particles from the contents of the launder. The launder is fitted with a product auger designed to lift and dewater the conditioned sand and to discharge this sand to either stockpile or the next process.

The conditioned sand is dried and then screened to the target frac sand size, in the example given, 850 µm to 425 µm using conventional screening systems, as will be understood by those skilled in the art.

The stirring device is preferably powered by a directly coupled electric motor. However, it will be appreciated that any suitable alternative power source, for example an internal combustion engine of suitable design, could be used. The electric motor allows for close control of the speed of rotation. Similarly, any suitable stirring design may be used. For example, the stirrer could include fins or blades extending from the inside of the cell, or the cell could be rotated relative to the central stirring element.

It will be understood that in any scaled up system, detailed consideration of the intended feedstock material, throughput, and geometry will be required to optimise performance in any given system. Slurry rheology is a complex topic, particularly when the intention is to modify the particle sizes within the slurry as the conditioning cell is operated. It is anticipated that in a typical set up, 600 to 750 W of power will be required per kilogram of material to be processed.

Variations and additions are possible within the general inventive concept, as will be understood by those skilled in the art.

The invention claimed is:

1. A process for producing frac sand having a predetermined size range and sphericity from a feedstock material, the process comprising:
   (a) placing said feedstock material in a chamber with a liquid, and causing the liquid to rotate so as to form a slurry, under conditions such that the particles in the slurry are caused to mutually abrade;
   (b) continuing to rotate the slurry until such time as at least a substantial part of the particles in the slurry meet the predetermined size range and sphericity requirements.

2. A process according to claim 1, wherein the rotation is produced by stirring the slurry.

3. A process according to claim 1, wherein the liquid is selected from the group consisting of water, and a solution comprising water.

4. A process according to claim 1, wherein the feedstock material is selected to have a minimum and maximum particle size substantially larger than the minimum and maximum of said predetermined size range.

5. A process according claim 1, wherein the slurry is dried and screened so as to produce frac sand having the predetermined size range and sphericity.

6. An apparatus adapted for producing frac sand having a predetermined size range and sphericity from a feedstock material formed from particles, the apparatus comprising a conditioning cell having an entry port for introducing liquid and feedstock material, and a discharge port for discharging the contents of the conditioning cell, the conditioning cell including a mechanism for operatively causing the feedstock material and liquid to rotate within the cell with sufficient speed to produce a slurry and to cause mutual abrasion of particles within the feedstock material, the apparatus being operatively adapted to rotate the slurry until such time as at least a substantial part of the particles in the slurry meet the predetermined size range and sphericity requirements.

7. An apparatus according to claim 6, wherein the mechanism is a stirring device which rotates within the cell.

8. An apparatus according to claim 6, wherein the conditioning cell is generally cylindrical, and the stirring device including radially projecting beater elements and operates in a substantially vertical plane, the gap between the beater elements and the walls of the cell being minimised, so that the particles in the slurry are operatively subjected to forces from the beater elements such that the particles self-abrade.

9. An apparatus according to claim 8, wherein the apparatus further includes a screening device, so that the output frac sand substantially conforms to a desired size range.

10. A frac sand product produced by the process of claim 1.

11. A process according to claim 3, wherein more than 20% of the slurry is comprised of the liquid.

12. An apparatus according to claim 6, wherein more than 20% of the slurry is comprised of the liquid.

13. A process according to claim 3, wherein more than 25% by weight of the slurry is comprised of the liquid.

14. An apparatus according to claim 6, wherein more than 25% by weight of the slurry is comprised of the liquid.

* * * * *